(12) United States Patent
Pebre

(10) Patent No.: US 7,489,095 B2
(45) Date of Patent: Feb. 10, 2009

(54) ADJUSTMENT OF ANTI-PINCH PARAMETERS ACCORDING TO VOLTAGE

(76) Inventor: Thierry Pebre, 14, allee du clos du godet, Checy (FR) 45430

( * ) Notice: Subject to any disclaimer, the term of this patent is extended or adjusted under 35 U.S.C. 154(b) by 341 days.

(21) Appl. No.: 11/398,220

(22) Filed: Apr. 5, 2006

(65) Prior Publication Data

US 2007/0236161 A1 Oct. 11, 2007

(51) Int. Cl.
*H02P 1/00* (2006.01)
(52) U.S. Cl. ............... 318/280; 318/283; 318/466
(58) Field of Classification Search ............... 318/280, 318/283, 461, 466, 468, 432, 266
See application file for complete search history.

(56) References Cited

U.S. PATENT DOCUMENTS

| | | | |
|---|---|---|---|
| 4,808,894 A * | 2/1989 | Mizuta | ............... 318/266 |
| 6,219,599 B1 | 4/2001 | Lamm | |
| 6,472,836 B1 | 10/2002 | Uebelein et al. | |
| 7,170,244 B2 | 1/2007 | Choby | |
| 2004/0212338 A1* | 10/2004 | Shimizu et al. | ............... 318/469 |

FOREIGN PATENT DOCUMENTS

| | | |
|---|---|---|
| DE | 4020351 | 1/1992 |
| DE | 10149578 A1 | 4/2003 |
| EP | 0894356 | 10/1997 |
| EP | 1054128 | 11/2000 |
| EP | 1174975 | 1/2002 |

* cited by examiner

*Primary Examiner*—Rina I Duda

(57) ABSTRACT

An anti-pinch control utilizes certain vehicle information to adjust anti-pinch parameters used to control movement of a powered closure member. The anti-pinch control determines whether a vehicle is stationary, and identifies if an engine is "on" or "off." A low pinch force parameter is applied when the vehicle is stationary and when the engine is "off." A high pinch force parameter is applied when the engine is "on." When the low pinch force parameter is being applied, other safety features could also be incorporated into the control, such as preventing release of a parking brake or preventing movement of a gear selector out of park, for example.

23 Claims, 1 Drawing Sheet

ADJUSTMENT OF ANTI-PINCH PARAMETERS ACCORDING TO VOLTAGE

TECHNICAL FIELD

An anti-pinch control utilizes vehicle information factors to adjust pinch force parameters to control movement of a powered vehicle component.

BACKGROUND OF THE INVENTION

Children can be left momentarily in a vehicle or can be playing inside a vehicle, while the vehicle is parked or while the vehicle is in some type of non-driving mode of operation. The children are often able to release seatbelts such that they are able to move within a passenger compartment area. Sometimes these children are able to insert a key within a vehicle ignition or are able to activate other types of vehicle systems by using keyless entry. This could have unfortunate consequences.

If a child is playing inside a vehicle and manages to activate a window closing mechanism for example, the child could have a head, neck, arm, fingers, or other body parts pinched between a moving window pane and a vehicle frame member. This could cause serious injury to the child.

Many different anti-pinch control systems have been proposed to address this problem. These systems often do not work effectively to provide desired window movement control under various different operational conditions. One proposed solution reduces a pinch detection threshold for a motor that raises a window under certain conditions. The motor is monitored through a set of parameters such that a determination can be made when to reverse motion when a critical threshold is achieved. These parameters cover a wide range of vehicle operating conditions including ignition on/off, vehicle stationary/moving, high/low temperature, smooth/rough road surfaces, etc. This wide range of vehicle operating conditions leads to a very conservative set of parameters so that there are no unexpected reversals of movement. This conservative set of parameters works contrary to providing reduced pinching forces for preventing injury to vehicle occupants. In other words, if a less conservative set of parameters were used in an attempt to reduce potential injury, a vehicle operator may be dissatisfied with operation of the powered member under many different operating conditions.

Another proposed solution is to reduce raising speed of the window under certain conditions. The slow speed reduces the amount of window travel between pinching detection and actual window movement reversal. Reduced raising speed can be applied when the vehicle is stationary, for example. However, a vehicle operator may view such slow movement of the window as a potential system failure.

Thus, there is a need for a simple and effective method to adjust anti-pinch parameters without adversely affecting operational performance.

SUMMARY OF THE INVENTION

The subject invention provides an improved anti-pinch control that takes into account whether or not a vehicle is moving or stationary, and whether or not an engine is running. The anti-pinch control uses this information to adjust anti-pinch parameters associated with movement of a powered member relative to a vehicle structure. The powered member can comprise any type of powered vehicle component such as a window, sunroof, sliding door, tailgate, trunk lid, etc.

A method for adjusting the anti-pinch parameters includes the steps of determining whether a vehicle is stationary, and identifying one of an engine "on" condition and an engine "off" condition. A low pinch force parameter is applied when the vehicle is stationary and when the engine "off" condition is identified. A high pinch force parameter is applied when the engine "on" condition is identified, and when the vehicle is moving. When the engine "on" condition is identified and the vehicle is stationary, either the low or high pinch force parameter can be chosen according to a vehicle manufacturer preference, assuming that vehicle speed information is made available at an aperture anti-pinch controller.

Vehicle movement and engine operating conditions can be monitored and identified using many different types of vehicle information factors and/or characteristics. For example, vehicle voltage can be monitored to determine whether or not the engine is on or off. Typically, when the engine is on, the measured voltage is at a higher level than when the engine is off. Additionally, engine on and off information can be supplied via a dedicated pin connector or from a vehicle control unit through a communication bus. Other vehicle information such as vehicle speed could also be used for adjusting between different anti-pinch parameters.

The subject invention provides a simple and effective manner for identifying when low pinch force parameters should be used to eliminate possible injury to vehicle occupants. The anti-pinch control also adjusts to higher pinch force parameters when conditions are appropriate so that system performance is not adversely affected. These and other features of the present invention can be best understood from the following specification and drawings, the following of which is a brief description.

DETAILED DESCRIPTION OF THE PREFERRED EMBODIMENT

Figure 1:
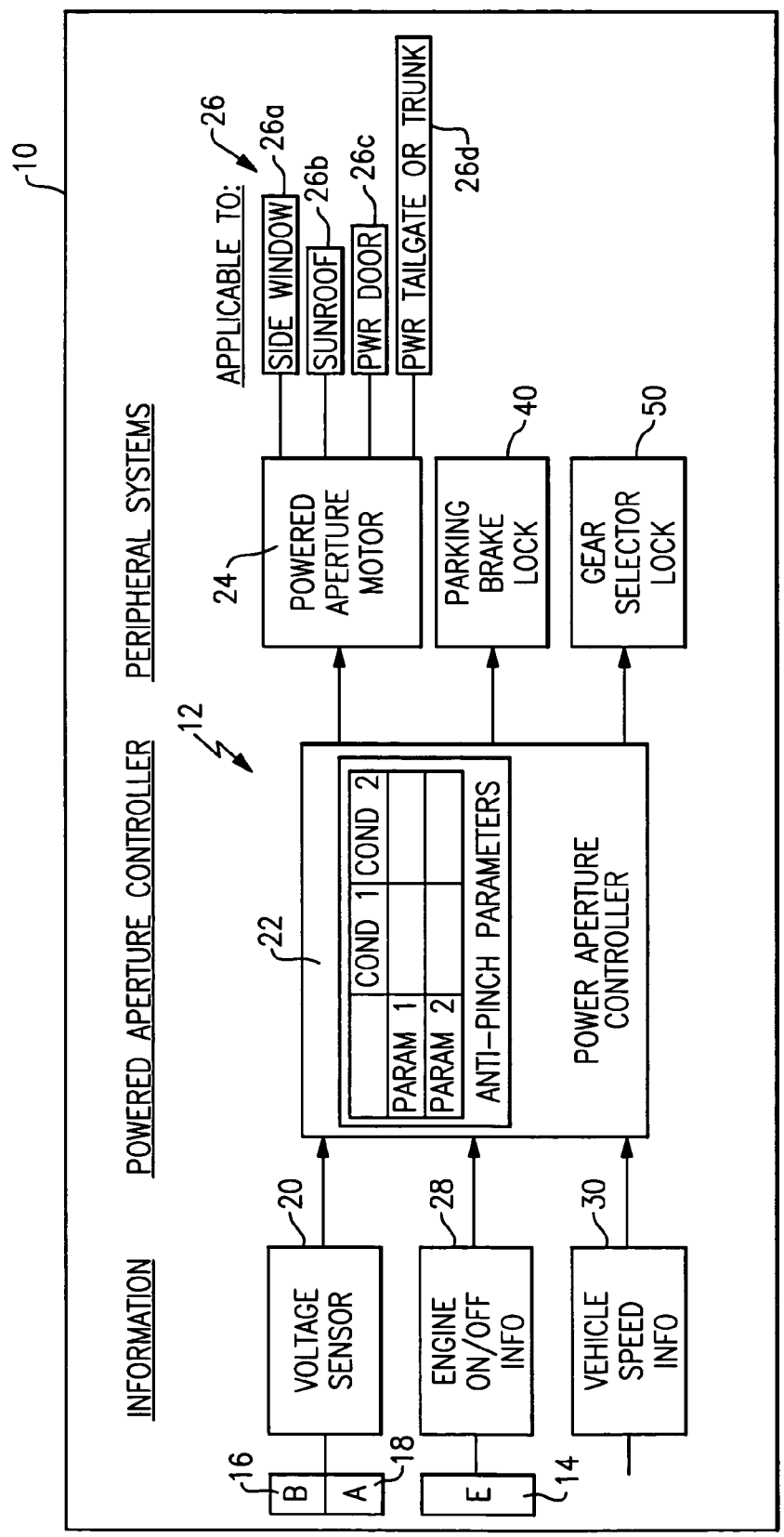
FIG. 1 is a schematic representation of an anti-pinch control system incorporating the subject invention.

A vehicle 10 includes an anti-pinch control system 12 for powered closure components, which adjusts between different pinch parameters for different conditions. Vehicle occupants can occupy the vehicle 10 during non-driving modes of operation for various reasons. For example, a child can be left in the vehicle 10, with an engine 14 being off or on, while a parent or adult is outside the vehicle 10. Or, the child could enter a vehicle without adult permission or knowledge. In either event, the child could intentionally or inadvertently activate certain vehicle systems, such as a powered window for example, which could be potentially harmful to the child, or to others.

The subject invention provides an improved anti-pinch control that takes into account whether or not a vehicle is moving or stationary, and whether or not the engine 14 is on or off. The anti-pinch control system 12 uses this information to adjust anti-pinch parameters associated with movement of a powered member relative to a vehicle structure. The vehicle 10 includes a power source, such as an engine 14, and a battery 16 and alternator 18. A voltage sensor 20 is associated with the battery 16 and alternator 18 to monitor vehicle voltage. The voltage sensor 20 communicates vehicle voltage information to a powered closure or aperture controller 22 that controls a powered aperture motor 24. The powered aperture motor 24 drives a powered closure component 26 between open and closed positions. The powered closure component 26 could be a window 26a, a sunroof 26b, a power door 26c, or a power tailgate or trunk 26d, for example. Further, each powered aperture could have a separate anti-pinch control unit, or the powered apertures could have the anti-pinch feature controlled by a vehicle master control unit.

In one example, the anti-pinch control system 12 determines whether the vehicle 10 is stationary, and identifies if the engine 14 is on or off. A low pinch force parameter is applied when the vehicle 10 is stationary and when the engine is off. A high pinch force parameter is applied when the engine is on. Thus, the low pinch force parameter provides a higher level of protection through tighter control parameters; and if the vehicle 10 is being driven or has the engine 14 on, then the higher pinch force parameter, i.e., standard/normal level of pinch protection, applies, which provides more robustness in behavior at the expense of having a higher pinching force.

Further, when operating in a high safety condition, i.e. when low pinch force parameters are applied, it is possible to provide other safety features. For example, the anti-pinch control system 12 could interface with other vehicle systems such as a parking brake lock 40 and/or gear selector lock 50. If low pinch parameters are being utilized, the parking brake lock 40 could be actuated to prevent a parking brake from being released, and/or the gear selector lock 50 could be actuated to prevent a gear selector from moving out of park for an automated gearbox, or out of a pre-set position for a manual or semi-automated gear box. These locks could be disabled by any appropriate means, provided that the means for disabling is not easily accessible by a child, in order to perform service or towing of the vehicle.

Vehicle movement and engine operating conditions can be monitored and identified using many different types of vehicle information factors and/or characteristics. For example, vehicle voltage can be continuously monitored to determine whether or not the engine 14 is on or off. Typically, when the engine 14 is on, the measured voltage is at a higher level than when the engine 14 is off. One potential disadvantage with using vehicle voltage alone is that it may not be accurate enough to discriminate status between a new and fully loaded battery 16 and an alternator 18, and regulator that would be operating at a bottom limit of a working range.

Thus, as another option, or in addition to using vehicle voltage information, engine on and off information 28 could be supplied with a dedicated pin in an anti-pinch control unit connector, or from the vehicle master control unit through a communication bus.

Another alternative source of information is vehicle speed information 30. Vehicle speed information could be supplied from a tachometer or from an ABS sensor in a vehicle wheel. This would require a communication bus to communicate this information to the anti-pinch control system 12.

When vehicle voltage information is being used, the method for adjusting anti-pinch parameters for the powered closure component 26 includes determining a vehicle information factor including measuring a vehicle condition, such as vehicle voltage, and adjusting operating conditions for the powered closure component 26 based on the vehicle information factor. The powered closure component 26 is operated at a first anti-pinch parameter condition when the vehicle information factor is associated with a first vehicle condition, and is operated at a second anti-pinch parameter condition different from the first anti-pinch parameter condition when the vehicle information factor is associated with a second vehicle condition.

In this example, the first vehicle condition is an engine off condition and the second vehicle condition is an engine on condition. The vehicle voltage is higher for the engine on condition than for the engine off condition. Typically, the vehicle voltage is approximately fourteen and one-half volts (14.5 V) for the engine on condition and is approximately twelve volts (12 V) for the engine off condition.

As discussed above, the first anti-pinch parameter condition is the low pinch force parameter and the second anti-pinch parameter condition is the high pinch force parameter. The low pinch parameter provides a higher level of safety as reversal occurs at lower pinching forces than would occur if the high pinch force parameters were used.

Further, as discussed above, vehicle speed information could also be used. The vehicle information factor could be based on a combination of at least the vehicle voltage and the vehicle speed. The operating condition for the powered closure component 26 would be adjusted to the low pinch force parameter when the vehicle speed is zero, i.e. the vehicle 10 is stationary, and the engine is off, i.e. vehicle voltage is approximately 12 V. The operating condition for the powered closure component 26 would be adjusted to the high pinch force parameter when the vehicle speed is greater than zero, i.e. the vehicle 10 is moving, and the engine is on, i.e. vehicle voltage is approximately 14.5 V.

Although a preferred embodiment of this invention has been disclosed, a worker of ordinary skill in this art would recognize that certain modifications would come within the scope of this invention. For that reason, the following claims should be studied to determine the true scope and content of this invention.

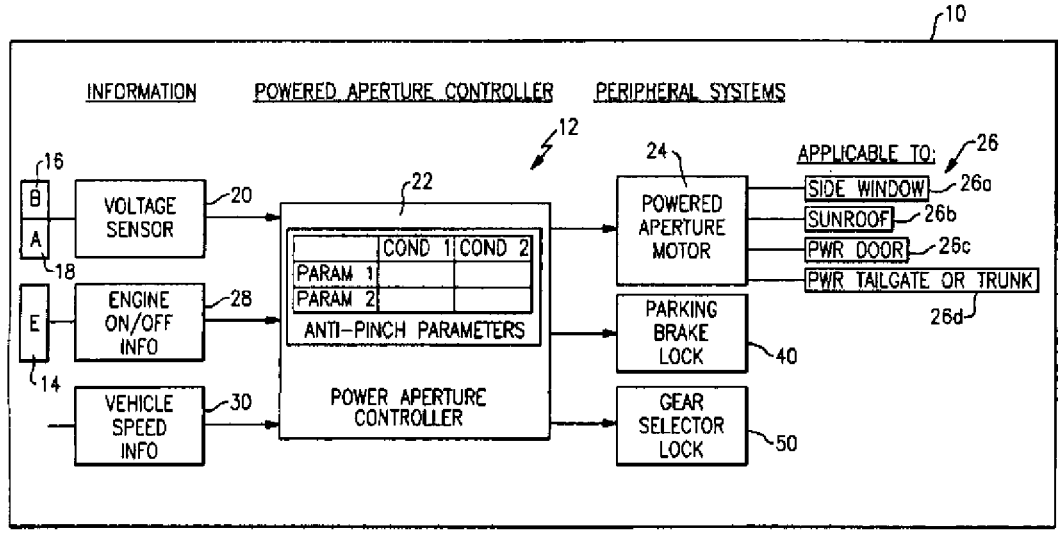

What is claimed is:

1. A method for adjusting anti-pinch parameters used to control movement of a powered member relative to a vehicle structure comprising the steps of:
   (a) determining a vehicle information factor including measuring at least a vehicle voltage; and
   (b) adjusting operating conditions for the powered member based on the vehicle information factor determined in step (a), including operating the powered member at a first anti-pinch parameter condition when the vehicle information factor is associated with a first vehicle condition, and operating the powered member at a second anti-pinch parameter condition different from the first anti-pinch parameter condition when the vehicle information factor is associated with a second vehicle condition.

2. The method according to claim 1 wherein the vehicle voltage measured during step (a) is higher for the second vehicle condition than for the first vehicle condition.

3. The method according to claim 2 wherein the first vehicle condition comprises an engine "off" condition and the second vehicle condition comprises an engine "on" condition.

4. The method according to claim 3 wherein a vehicle voltage is approximately fourteen and one-half volts for the engine "on" condition and is approximately twelve volts for the engine "off" condition.

5. The method according to claim 3 wherein the first anti-pinch parameter condition comprises a low pinch force parameter and the second anti-pinch parameter condition comprises a high pinch force parameter.

6. The method according to claim 5 including the step of prohibiting release of a parking brake when operating with the low pinch force parameter.

7. The method according to claim 5 including the step of prohibiting movement of a gear selector out of a park position when operating with the low pinch force parameter.

8. The method according to claim 1 wherein the first anti-pinch parameter condition comprises a low pinch force parameter and the second anti-pinch parameter condition comprises a high pinch force parameter and wherein step (a) includes determining the vehicle information factor based on at least the vehicle voltage and a vehicle speed, and including the steps of adjusting the operating condition for the powered member to the low pinch force parameter when the vehicle speed is a first vehicle speed and when the vehicle voltage is a first voltage, and adjusting the operating condition for the powered member to the high pinch force parameter when the vehicle speed is a second vehicle speed greater than the first vehicle speed and the vehicle voltage is a second voltage that is greater than the first voltage.

9. The method according to claim 1 wherein the first vehicle condition comprises an engine "off" condition and the second vehicle condition comprises an engine "on" condition, and wherein the first anti-pinch parameter condition comprises a first pinch force parameter and the second anti-pinch parameter condition comprises a second pinch force parameter that is greater than the first pinch force parameter.

10. A method for adjusting anti-pinch parameters used to control movement of a powered member relative to a vehicle structure comprising the steps of:
 (a) determining whether a vehicle is stationary;
 (b) identifying one of an engine "on" condition and an engine "off" condition; and
 (c) applying a low pinch force parameter when the vehicle is stationary and when the engine "off" condition is identified, and applying a high pinch force parameter when the engine "on" condition is identified.

11. The method according to claim 10 wherein step (b) includes monitoring at least one of a vehicle voltage and a vehicle speed to identify an engine condition.

12. The method according to claim 10 including preventing at least one of a release of a parking brake and movement of a gear selector out of a park position when operating with the low pinch force parameter.

13. The method according to claim 10 wherein the high pinch force parameter defines a first pinching force and the low pinch force parameter defines a second pinching force that is less than the first pinching force.

14. An anti-pinch control system for controlling a powered member that moves relative to a vehicle structure comprising:
 a voltage sensor that generates a vehicle voltage signal; and
 an electronic control unit that receives the vehicle voltage signal, associates the vehicle voltage signal with a vehicle operating condition, and adjusts operating conditions for the powered member based on the vehicle operating condition wherein the electronic control unit operates the powered member at a low pinch force parameter for a first vehicle condition and operates the powered member at high pinch force parameter for a second vehicle condition, and wherein the vehicle voltage signal for the first vehicle condition comprises a first voltage and the vehicle voltage signal for the second vehicle condition comprises a second voltage that is higher than the first voltage.

15. The anti-pinch control system according to claim 14 wherein the first vehicle condition is associated with an engine "off" condition and the second vehicle condition is associated with an engine "on" condition.

16. The anti-pinch control system according to claim 15 wherein the first voltage is approximately twelve volts for the engine "off" condition and the second voltage is approximately fourteen and one-half volts for the engine "on" condition.

17. The anti-pinch control system according to claim 14 wherein the electronic control unit prohibits a release of a parking brake when operating with the low pinch force parameter.

18. The anti-pinch control system according to claim 14 wherein the electronic control unit prohibits a gear selector from being moved out of a park position when operating with the low pinch force parameter.

19. The anti-pinch control system according to claim 14 including a vehicle speed sensor that generates a vehicle speed signal, wherein the electronic control unit adjusts the operating condition for the powered member to the low pinch force parameter when the vehicle speed sensor measures a first vehicle speed and when the vehicle voltage is the first voltage, and adjusts the operating condition for the powered member to the high pinch force parameter when the vehicle speed sensor measures a second vehicle speed greater than the first vehicle speed and the vehicle voltage is the second voltage that is greater than the first voltage.

20. The anti-pinch control system according to claim 14 wherein the powered member comprises a panel that moves relative to the vehicle structure between an open position and a closed position.

21. The anti-pinch control system according to claim 14 wherein the voltage sensor is associated with a vehicle battery.

22. The anti-pinch control system according to claim 14 wherein the electronic control unit is one of a vehicle master control unit and a separate anti-pinch control unit associated with each powered member.

23. The anti-pinch control system according to claim 14 wherein the first vehicle condition comprises an engine "off" condition and the second vehicle condition comprises an engine "on" condition, and wherein the first anti-pinch parameter condition comprises a first pinch force parameter and the second anti-pinch parameter condition comprises a second pinch force parameter that is greater than the first pinch force parameter.

\* \* \* \* \*

UNITED STATES PATENT AND TRADEMARK OFFICE
CERTIFICATE OF CORRECTION

PATENT NO. : 7,489,095 B2  Page 1 of 1
APPLICATION NO. : 11/398220
DATED : February 10, 2009
INVENTOR(S) : Thierry Pebre It is certified that error appears in the above-identified patent and that said Letters Patent is hereby corrected as shown below:

ON THE TITLE PAGE:

Keep

(73) Assignee: ArvinMeritor Light Vehicle Systems - France, Sully-sur-Loire, France

(74) Attorney, Agent or Firm - Carlson Gaskey & Olds

Signed and Sealed this

Ninth Day of June, 2009

JOHN DOLL
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 7,489,095 B2 | |
| APPLICATION NO. | : 11/398220 | |
| DATED | : February 10, 2009 | |
| INVENTOR(S) | : Thierry Pebre | |

It is certified that error appears in the above-identified patent and that said Letters Patent is hereby corrected as shown below:

This certificate supersedes the Certificate of Correction issued June 9, 2009. The certificate should be vacated since correction to add assignee was denied. The Certificate of Correction was issued in error. A petition to correct the assignee under 3.81(b) was not granted to insert assignee.

Signed and Sealed this

Seventh Day of July, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,489,095 B2
APPLICATION NO. : 11/398220
DATED : February 10, 2009
INVENTOR(S) : Thierry Pebre It is certified that error appears in the above-identified patent and that said Letters Patent is hereby corrected as shown below:

Delete the title page and substitute therefor the attached title page.

ON THE TITLE PAGE:

Insert

--(73) Assignee: ArvinMeritor Light Vehicle Systems - France, Sully-sur-Loire, France

(74) Attorney, Agent or Firm - Carlson Gaskey & Olds--

Signed and Sealed this

Eighteenth Day of August, 2009

David J. Kappos
*Director of the United States Patent and Trademark Office*

(12) United States Patent
Pebre

(10) Patent No.: US 7,489,095 B2
(45) Date of Patent: Feb. 10, 2009

(54) ADJUSTMENT OF ANTI-PINCH PARAMETERS ACCORDING TO VOLTAGE

(75) Inventor: Thierry Pebre, 14, allee du clos du godet, Checy (FR) 45430

(73) Assignee: ArvinMeritor Light Vehicle Systems-France, Sully-sur Loire, France ( * ) Notice: Subject to any disclaimer, the term of this patent is extended or adjusted under 35 U.S.C. 154(b) by 341 days.

(21) Appl. No.: 11/398,220

(22) Filed: Apr. 5, 2006

(65) Prior Publication Data

US 2007/0236161 A1 Oct. 11, 2007

(51) Int. Cl.
*H02P 1/00* (2006.01)

(52) U.S. Cl. .................. 318/280; 318/283; 318/466

(58) Field of Classification Search .......... 318/280, 318/283, 461, 466, 468, 432, 266
See application file for complete search history.

(56) References Cited

U.S. PATENT DOCUMENTS 4,808,894 A * 2/1989 Mizuta .................. 318/266
6,219,599 B1 4/2001 Lamm
6,472,836 B1 10/2002 Uebelein et al.
7,170,244 B2 1/2007 Choby
2004/0212338 A1 * 10/2004 Shimizu et al. ........... 318/469

FOREIGN PATENT DOCUMENTS

| DE | 4020351 | 1/1992 |
| DE | 10149578 A1 | 4/2003 |
| EP | 0894356 | 10/1997 |
| EP | 1054128 | 11/2000 |
| EP | 1174975 | 1/2002 |

* cited by examiner

*Primary Examiner*—Rina I Duda
(74) *Attorney, Agent, or Firm*—Carlson Gaskey & Olds

(57) ABSTRACT

An anti-pinch control utilizes certain vehicle information to adjust anti-pinch parameters used to control movement of a powered closure member. The anti-pinch control determines whether a vehicle is stationary, and identifies if an engine is "on" or "off." A low pinch force parameter is applied when the vehicle is stationary and when the engine is "off." A high pinch force parameter is applied when the engine is "on." When the low pinch force parameter is being applied, other safety features could also be incorporated into the control, such as preventing release of a parking brake or preventing movement of a gear selector out of park, for example.

23 Claims, 1 Drawing Sheet